United States Patent
Wong et al.

(10) Patent No.: US 8,548,953 B2
(45) Date of Patent: Oct. 1, 2013

(54) FILE DEDUPLICATION USING STORAGE TIERS

(75) Inventors: Thomas K. Wong, Pleasanton, CA (US); Ron S. Vogel, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 367 days.

(21) Appl. No.: 12/268,573

(22) Filed: Nov. 11, 2008

(65) Prior Publication Data

US 2009/0204649 A1    Aug. 13, 2009

Related U.S. Application Data

(60) Provisional application No. 60/987,181, filed on Nov. 12, 2007.

(51) Int. Cl.
*G06F 7/00* (2006.01)
*G06F 17/00* (2006.01)

(52) U.S. Cl.
USPC ............................. 707/664; 707/692; 707/698

(58) Field of Classification Search
USPC ................. 707/200, 203, 204, 205, 206, 639, 707/649, 664, 696, 698, 633, 640, 641, 692; 711/161, 162
See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,303,368 A | 4/1994 | Kotaki | |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |
| 5,548,724 A | 8/1996 | Akizawa et al. | |

(Continued)

FOREIGN PATENT DOCUMENTS

| AU | 2003300350 A1 | 7/2004 |
|---|---|---|
| CA | 2080530 A1 | 4/1994 |

(Continued)

OTHER PUBLICATIONS

"The AFS File System in Distributed Computing Environment", www.transarc.ibm.com/Library/whitepapers/AFS/afsoverview. html, last accessed on Dec. 20, 2002.

(Continued)

*Primary Examiner* — Vincent F Boccio
(74) *Attorney, Agent, or Firm* — LeClairRyan, a Professional Corporation

(57) ABSTRACT

A method and apparatus for removing duplicated data in a file system utilizing the concept of storage tiers. A synthetic namespace is created via file virtualization, and is comprised of one or more file systems. Deduplication is applied at the namespace level and on all of the file systems comprising the synthetic namespace. All files in a file system in a higher storage tier whose contents are identical to at least one other file in the synthetic namespace are moved to a destination file system in a lower storage tier. For each set of duplicated files that are moved from the original servers, a single instance copy of the file is left behind as a mirror copy. Read access to a duplicated file is redirected to its mirror copy. When the first write to a duplicated file is received, the association from the duplicated file stored in the destination server to its mirror copy that is stored in the origin server is discarded. Access to the "modified" duplicated file will then resume normally from the destination server.

28 Claims, 3 Drawing Sheets

(56) References Cited

U.S. PATENT DOCUMENTS

| | | |
|---|---|---|
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,324,581 B1 | 11/2001 | Xu et al. |
| 6,329,985 B1 | 12/2001 | Tamer et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,654,346 B1 | 11/2003 | Mahalingaiah et al. |
| 6,721,794 B2 | 4/2004 | Taylor et al. |
| 6,728,265 B1 | 4/2004 | Yavatkar et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,757,706 B1 | 6/2004 | Dong et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Kar et al. |
| 6,850,997 B1 | 2/2005 | Rooney et al. |
| 6,871,245 B2 | 3/2005 | Bradley |
| 6,880,017 B1 | 4/2005 | Marce et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,010,553 B2 | 3/2006 | Chen et al. |
| 7,013,379 B1 | 3/2006 | Testardi |
| 7,039,061 B2 | 5/2006 | Connor et al. |
| 7,051,112 B2 | 5/2006 | Dawson |
| 7,072,917 B2 | 7/2006 | Wong et al. |
| 7,075,924 B2 | 7/2006 | Richter et al. |
| 7,089,286 B1 | 8/2006 | Malik |
| 7,111,115 B2 | 9/2006 | Peters et al. |
| 7,113,962 B1 | 9/2006 | Kee et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,173,929 B1 | 2/2007 | Testardi |
| 7,194,579 B2 | 3/2007 | Robinson et al. |
| 7,234,074 B2 | 6/2007 | Cohn et al. |
| 7,236,491 B2 | 6/2007 | Tsao et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,343,398 B1 | 3/2008 | Lownsbrough |
| 7,346,664 B2 | 3/2008 | Wong et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |

| Patent/Pub No. | Date | Inventor(s) |
|---|---|---|
| 7,562,110 B2 | 7/2009 | Miloushev et al. |
| 7,571,168 B2 | 8/2009 | Bahar et al. |
| 7,574,433 B2 | 8/2009 | Engel |
| 7,599,941 B2 | 10/2009 | Bahar et al. |
| 7,610,307 B2 | 10/2009 | Havewala et al. |
| 7,624,109 B2 | 11/2009 | Testardi |
| 7,639,883 B2 | 12/2009 | Gill |
| 7,653,699 B1 | 1/2010 | Colgrove et al. |
| 7,685,177 B1 | 3/2010 | Hagerstrom et al. |
| 7,734,603 B1 * | 6/2010 | McManis .................. 707/696 |
| 7,788,335 B2 | 8/2010 | Miloushev et al. |
| 7,809,691 B1 | 10/2010 | Karmarkar et al. |
| 7,818,299 B1 | 10/2010 | Federwisch et al. |
| 7,822,939 B1 * | 10/2010 | Veprinsky et al. ............ 711/162 |
| 7,831,639 B1 | 11/2010 | Panchbudhe et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,904,466 B1 | 3/2011 | Valencia et al. |
| 7,913,053 B1 | 3/2011 | Newland |
| 7,953,701 B2 | 5/2011 | Okitsu et al. |
| 7,958,347 B1 | 6/2011 | Ferguson |
| 8,005,953 B2 | 8/2011 | Miloushev et al. |
| 8,046,547 B1 | 10/2011 | Chatterjee et al. |
| 8,103,622 B1 | 1/2012 | Karinta |
| 8,112,392 B1 | 2/2012 | Bunnell et al. |
| 8,271,751 B2 | 9/2012 | Hinrichs, Jr. |
| 8,326,798 B1 | 12/2012 | Driscoll et al. |
| 8,351,600 B2 | 1/2013 | Resch |
| 2001/0007560 A1 | 7/2001 | Masuda et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0087887 A1 | 7/2002 | Busam et al. |
| 2002/0106263 A1 | 8/2002 | Winker |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0188667 A1 | 12/2002 | Kirnos |
| 2002/0194342 A1 | 12/2002 | Lu et al. |
| 2003/0009429 A1 | 1/2003 | Jameson |
| 2003/0012382 A1 | 1/2003 | Ferchichi et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0065956 A1 | 4/2003 | Belapurkar et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0135514 A1 | 7/2003 | Patel et al. |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0200207 A1 | 10/2003 | Dickinson |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0044705 A1 | 3/2004 | Stager et al. |
| 2004/0054748 A1 | 3/2004 | Ackaouy et al. |
| 2004/0054777 A1 | 3/2004 | Ackaouy et al. |
| 2004/0093474 A1 | 5/2004 | Lin et al. |
| 2004/0098383 A1 | 5/2004 | Tabellion et al. |
| 2004/0098595 A1 | 5/2004 | Aupperle et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133650 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0213156 A1 | 10/2004 | Smallwood et al. |
| 2004/0236798 A1 | 11/2004 | Srinivasan et al. |
| 2004/0267830 A1 | 12/2004 | Wong et al. |
| 2005/0021615 A1 | 1/2005 | Arnott et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0160161 A1 | 7/2005 | Barrett et al. |
| 2005/0175013 A1 | 8/2005 | Le Pennec et al. |
| 2005/0187866 A1 | 8/2005 | Lee |
| 2005/0198501 A1 | 9/2005 | Andreev et al. |
| 2005/0213587 A1 | 9/2005 | Cho et al. |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0045096 A1 | 3/2006 | Farmer et al. |
| 2006/0074922 A1 | 4/2006 | Nishimura |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbit et al. |
| 2006/0140193 A1 | 6/2006 | Kakani et al. |
| 2006/0153201 A1 | 7/2006 | Hepper et al. |
| 2006/0161518 A1 | 7/2006 | Lacapra |
| 2006/0167838 A1 | 7/2006 | Lacapra |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0206547 A1 | 9/2006 | Kulkarni et al. |
| 2006/0212746 A1 | 9/2006 | Amegadzie et al. |
| 2006/0218135 A1 | 9/2006 | Bisson et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0268692 A1 | 11/2006 | Wright et al. |
| 2006/0271598 A1 | 11/2006 | Wong et al. |
| 2006/0277225 A1 | 12/2006 | Mark et al. |
| 2006/0282461 A1 * | 12/2006 | Marinescu ................ 707/103 Y |
| 2006/0282471 A1 | 12/2006 | Mark et al. |
| 2007/0022121 A1 | 1/2007 | Bahar et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0088702 A1 | 4/2007 | Fridella et al. |
| 2007/0098284 A1 | 5/2007 | Sasaki et al. |
| 2007/0136308 A1 | 6/2007 | Tsirigotis et al. |
| 2007/0139227 A1 | 6/2007 | Speirs, II et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0046432 A1 | 2/2008 | Anderson et al. |
| 2008/0070575 A1 | 3/2008 | Claussen et al. |
| 2008/0104443 A1 | 5/2008 | Akutsu et al. |

| | | | |
|---|---|---|---|
| 2008/0114718 | A1 | 5/2008 | Anderson et al. |
| 2008/0189468 | A1 | 8/2008 | Schmidt et al. |
| 2008/0200207 | A1 | 8/2008 | Donahue et al. |
| 2008/0209073 | A1 | 8/2008 | Tang |
| 2008/0215836 | A1 | 9/2008 | Sutoh et al. |
| 2008/0222223 | A1 | 9/2008 | Srinivasan et al. |
| 2008/0243769 | A1* | 10/2008 | Arbour et al. ............... 707/204 |
| 2008/0282047 | A1 | 11/2008 | Arakawa et al. |
| 2008/0294446 | A1 | 11/2008 | Guo et al. |
| 2009/0007162 | A1 | 1/2009 | Sheehan |
| 2009/0013138 | A1 | 1/2009 | Sudhakar |
| 2009/0037975 | A1 | 2/2009 | Ishikawa et al. |
| 2009/0041230 | A1 | 2/2009 | Williams |
| 2009/0055507 | A1 | 2/2009 | Oeda |
| 2009/0055607 | A1 | 2/2009 | Schack et al. |
| 2009/0077097 | A1 | 3/2009 | Lacapra et al. |
| 2009/0089344 | A1 | 4/2009 | Brown et al. |
| 2009/0094252 | A1 | 4/2009 | Wong et al. |
| 2009/0106255 | A1 | 4/2009 | Lacapra et al. |
| 2009/0106263 | A1 | 4/2009 | Khalid et al. |
| 2009/0132616 | A1 | 5/2009 | Winter et al. |
| 2009/0204649 | A1 | 8/2009 | Wong et al. |
| 2009/0204650 | A1 | 8/2009 | Wong et al. |
| 2009/0204705 | A1 | 8/2009 | Marinov et al. |
| 2009/0210431 | A1 | 8/2009 | Marinkovic et al. |
| 2009/0210875 | A1 | 8/2009 | Bolles et al. |
| 2009/0240705 | A1 | 9/2009 | Miloushev et al. |
| 2009/0240899 | A1 | 9/2009 | Akagawa et al. |
| 2009/0254592 | A1 | 10/2009 | Marinov et al. |
| 2009/0265396 | A1 | 10/2009 | Ram et al. |
| 2010/0017643 | A1 | 1/2010 | Baba et al. |
| 2010/0077294 | A1 | 3/2010 | Watson |
| 2010/0082542 | A1 | 4/2010 | Feng et al. |
| 2010/0205206 | A1 | 8/2010 | Rabines et al. |
| 2010/0211547 | A1 | 8/2010 | Kamei et al. |
| 2010/0325634 | A1 | 12/2010 | Ichikawa et al. |
| 2011/0083185 | A1 | 4/2011 | Sheleheda et al. |
| 2011/0087696 | A1 | 4/2011 | Lacapra |
| 2011/0093471 | A1 | 4/2011 | Brockway et al. |
| 2011/0107112 | A1 | 5/2011 | Resch |
| 2011/0119234 | A1 | 5/2011 | Schack et al. |
| 2011/0320882 | A1 | 12/2011 | Beaty et al. |
| 2012/0144229 | A1 | 6/2012 | Nadolski |
| 2012/0150699 | A1 | 6/2012 | Trapp et al. |

FOREIGN PATENT DOCUMENTS

| | | |
|---|---|---|
| CA | 2512312 A1 | 7/2004 |
| EP | 0605088 A3 | 2/1996 |
| EP | 0 738 970 A1 | 10/1996 |
| JP | 63010250 A | 1/1988 |
| JP | 6205006 A | 7/1994 |
| JP | 06-332782 | 12/1994 |
| JP | 8021924 B | 3/1996 |
| JP | 08-328760 | 12/1996 |
| JP | 08-339355 | 12/1996 |
| JP | 9016510 A | 1/1997 |
| JP | 11282741 A1 | 10/1999 |
| JP | 2000-183935 | 6/2000 |
| NZ | 566291 A | 12/2008 |
| WO | 02/39696 A2 | 5/2002 |
| WO | WO 02/056181 A2 | 7/2002 |
| WO | WO 2004/061605 A2 | 7/2004 |
| WO | 2006091040 A1 | 8/2006 |
| WO | WO 2008/130983 A1 | 10/2008 |
| WO | WO 2008/147973 A2 | 12/2008 |

OTHER PUBLICATIONS

Aguilera, Marcos K. et al., "Improving recoverability in multi-tier storage systems", International Conference on Dependable Systems and Networks (DSN-2007), Edinburgh, Scotland, Jun. 2007, 10 pages.

Anderson, Darrell C. et al., "Interposed Request Routing for Scalable Network Storage", ACM Transactions on Computer Systems 20(1): (Feb. 2002), pp. 1-24.

Anderson et al., "Serverless Network File System", in the 15th Symposium on Operating Systems Principles, Dec. 1995, Association for Computing Machinery, Inc.

Anonymous, "How DFS Works: Remote File Systems", Distributed File System (DFS) Technical Reference, retrieved from the Internet on Feb. 13, 2009: URL<:http://technetmicrosoft.com/en-us/library/cc782417W5.10,printer).aspx> (Mar. 2003).

Apple, Inc., "Mac OS X Tiger Keynote Intro. Part 2", Jun. 2004, www.youtube.com <http://www.youtube.com/watch?v=zSBJwEmR.JbY>, p. 1.

Apple, Inc., "Tiger Developer Overview Series: Working with Spotlight", Nov. 23, 2004, www.apple.com using www.archive.org <http://web.archive.org/web/20041123005335/developer.apple.com/macosx/tiger/sp otlight.html>, pp. 1-6.

"Auspex Storage Architecture Guide", Second Edition, 2001, Auspex Systems, Inc., www.auspex.com, last accessed on Dec. 30, 2002.

Cabrera et al., "Swift: Storage Architecture for Large Objects", in Proceedings of the-Eleventh IEEE Symposium on Mass Storage Systems, pp. 123-128, Oct. 1991.

Cabrera et al., "Swift: Using Distributed Disk Striping to Provide High I/O Data Rates", Computing Systems 4, 4 (Fall 1991), pp. 405-436.

Cabrera et al., "Using Data Striping in a Local Area Network", 1992, technical report No. UCSC-CRL-92-09 of the Computer & Information Sciences Department of University of California at Santa Cruz.

Callaghan et al., "NFS Version 3 Protocol Specifications" (RFC 1813), Jun. 1995, The Internet Engineering Task Force (IETN), www.ietf.org, last accessed on Dec. 30, 2002.

Carns et al., "PVFS: A Parallel File System for Linux Clusters", in Proceedings of the Extreme Linux Track: 4th Annual Linux Showcase and Conference, pp. 317-327, Atlanta, Georgia, Oct. 2000, USENIX Association.

Cavale, M. R., "Introducing Microsoft Cluster Service (MSCS) in the Windows Server 2003", Microsoft Corporation, Nov. 2002.

"CSA Persistent File System Technology", Colorado Software Architecture, Inc.: A White Paper, Jan. 1, 1999, p. 1-3, <http://www.cosoa.com/white_papers/pfs.php>.

"Distributed File System: Logical View of Physical Storage: White Paper", 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

English Language Abstract of JP 08-328760 from Patent Abstracts of Japan.

English Language Abstract of JP 08-339355 from Patent Abstracts of Japan.

English Translation of paragraphs 17, 32, and 40-52 of JP 08-328760.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks", Jan. 2000, McGraw Hill, ISBN 0072120509.

Gibson et al., "File Server Scaling with Network-Attached Secure Disks", in Proceedings of the ACM International Conference on Measurement and Modeling of Computer Systems (Sigmetrics '97), Jun. 15-18, 1997, Association for Computing Machinery, Inc.

Gibson et al., "NASD Scalable Storage Systems", Jun. 1999, USENIX99, Extreme Linux Workshop, Monterey, California.

Harrison, C., May 19, 2008 response to Communication pursuant to Article 96(2) EPC dated Nov. 9, 2007 in corresponding European patent application No. 02718824.2.

Hartman, J., "The Zebra Striped Network File System", 1994, Ph.D. dissertation submitted in the Graduate Division of the University of California at Berkeley.

Haskin et al., "The Tiger Shark File System", 1996, in proceedings of IEEE, Spring COMPCON, Santa Clara, CA, www.research.ibm.com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space", IEEE Concurrency, pp. 60-69, Jan.-Mar. 1999.

International Search Report for International Patent Application No. PCT/US2008/083117 (Jun. 23, 2009).
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT/US02/00720, Jul. 8, 2004.
International Search Report from International Application No. PCT/US03/41202, mailed Sep. 15, 2005.
Karamanolis, C. et al., "An Architecture for Scalable and Manageable File Services", HPL-2001-173, Jul. 26, 2001. p. 1-114.
Katsurashima, W. et al., "NAS Switch: A Novel CIFS Server Virtualization, Proceedings", 20th IEEE/11th NASA Goddard Conference on Mass Storage Systems and Technologies, 2003 (MSST 2003), Apr. 2003.
Kimball, C.E. et al., "Automated Client-Side Integration of Distributed Application Servers", 13Th LISA Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., Response filed by Japanese associate to office action dated Jan. 22, 2007 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)", RFC 1510, Sep. 1993. (http://www.ietf.org/ rfc/rfc1510.txt?number=1510).
Korkuzas, V., Communication pursuant to Article 96(2) EPC dated Sep. 11, 2007 in corresponding European patent application No. 02718824.2-2201.
Lelil, S., "Storage Technology News: AutoVirt adds tool to help data migration projects", Feb. 25, 2011, last accessed Mar. 17, 2011, <http://searchstorage.techtarget.com/news/article/0,289142, sid5_gci1527986,00. html>.
Long et al., "Swift/RAID: A distributed RAID System", Computing Systems, vol. 7, pp. 333-359, Summer 1994.
"NERSC Tutorials: I/O on the Cray T3E, 'Chapter 8, Disk Striping'", National Energy Research Scientific Computing Center (NERSC), http://hpcfnersc.gov, last accessed on Dec. 27, 2002.
Noghani et al., "A Novel Approach to Reduce Latency on the Internet: 'Component-Based Download'", Proceedings of the Computing, Las Vegas, NV, Jun. 2000, pp. 1-6 on the Internet: Intl Conf on Internet.
Norton et al., "CIFS Protocol Version CIFS-Spec 0.9", 2001, Storage Networking Industry Association (SNIA), www.snia.org, last accessed on Mar. 26, 2001.
Patterson et al., "A case for redundant arrays of inexpensive disks (RAID)", Chicago, Illinois, Jun. 1-3, 1998, in Proceedings of ACM SIGMOND conference on the Management of Data, pp. 109-116, Association for Computing Machinery, Inc., www.acm.org, last accessed on Dec. 20, 2002.
Pearson, P.K., "Fast Hashing of Variable-Length Text Strings", Comm. of the ACM, vol. 33, No. 6, Jun. 1990.
Peterson, M., "Introducing Storage Area Networks", Feb 1998, InfoStor, www.infostor.com, last accessed on Dec. 20, 2002.
Preslan et al., "Scalability and Failure Recovery in a Linux Cluster File System", in Proceedings of the 4th Annual Linux Showcase & Conference, Atlanta, Georgia, Oct. 10-14,2000, pp. 169-180 of the Proceedings, www.usenix.org, last accessed on Dec. 20, 2002.
Response filed Jul. 6, 2007 to Office action dated Feb. 6, 2007 for related U.S. Appl. No. 10/336,784.
Response filed Mar. 20, 2008 to Final Office action dated Sep. 21,2007 for related U.S. Appl. No. 10/336,784.
Rodriguez et al., "Parallel-access for mirror sites in the Internet", InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, pp. 864-873, XP010376176 ISBN: 0/7803-5880—5 p. 867, col. 2, last paragraph—p. 868, col. 1, paragraph 1.

Rsync, "Welcome to the RSYNC Web Pages", Retrieved from the Internet URL: http://samba.anu.edu.ut.rsync/. (Retrieved on Dec. 18, 2009).
Savage, et al., "AFRAID—A Frequently Redundant Array of Independent Disks", 1996 USENIX Technical Conf., San Diego, California, Jan. 22-26, 1996.
"Scaling Next Generation Web Infrastructure with Content-Intelligent Switching: White Paper", Apr. 2000, p. 1-9 Alteon Web Systems, Inc.
Soltis et al., "The Design and Performance of a Shared Disk File System for IRIX", in Sixth NASA Goddard Space Flight Center Conference on Mass Storage and Technologies in cooperation with the Fifteenth IEEE Symposium on Mass Storage Systems, Mar. 23-26, 1998.
Soltis, et al., "The Global File System", in Proceedings of the Fifth NASA Goddard Space Flight Center Conference on Mass Storage Systems and Technologies, Sep. 17-19, 1996, College Park, Maryland.
Sorenson, K.M., "Installation and Administration: Kimberlite Cluster Version 1.1.0, Rev. Dec. 2000", Mission Critical Linux, http://oss.missioncriticallinux.corn/kimberlite/kimberlite.pdf.
Stakutis, C., "Benefits of SAN-based file system sharing", Jul. 2000, InfoStor, www.infostor.com, last accessed on Dec. 30, 2002.
Thekkath et al., "Frangipani: A Scalable Distributed File System", in Proceedings of the 16th ACM Symposium on Operating Systems Principles, Oct. 1997, Association for Computing Machinery, Inc.
Uesugi, H., Nov. 26, 2008 amendment filed by Japanese associate in response to office action dated May 26, 2008 in corresponding Japanese patent application No. 2002556371.
Uesugi, H., English translation of office action dated May 26, 2008 in corresponding Japanese patent application No. 2002-556371.
Uesugi, H., Jul. 15, 2008 letter from Japanese associate reporting office action dated May 26, 2008 in corresponding Japanese patent application No. 2002-556371.
"VERITAS SANPoint Foundation Suite(tm) and SANPoint Foundation Suite(tm) HA: New VERITAS vol. Management and File System Technology for Cluster Environments", Sep. 2001, VERITAS Software Corp.
Wilkes, J., et al., "The HP AutoRAID Hierarchical Storage System", ACM Transactions on Computer Systems, vol. 14, No. 1, Feb. 1996.
"Windows Clustering Technologies—An Overview", Nov. 2001, Microsoft Corp., www.microsoft.com, last accessed on Dec. 30, 2002.
Zayas, E., "AFS-3 Programmer's Reference: Architectural Overview", Transarc Corp., version 1.0 of Sep. 2, 1991, doc. No. FS-00-D160.
Basney, Jim et al., "Credential Wallets: A Classification of Credential Repositories Highlighting MyProxy," TPRC 2003, Sep. 19-21, 2003.
Botzum, Keys, "Single Sign On—A Contrarian View," Open Group Website, <http://www.opengroup.org/security/topics.htm>, Aug. 6, 2001, pp. 1-8.
Novotny, Jason et al., "An Online Credential Repository for the Grid: MyProxy," 2001, pp. 1-8.
Pashalidis, Andreas et al., "A Taxonomy of Single Sign-On Systems," 2003, pp. 1-16, Royal Holloway, University of London, Egham Surray, TW20, 0EX, United Kingdom.
Pashalidis, Andreas et al., "Impostor: a single sign-on system for use from untrusted devices," Global Telecommunications Conference, 2004, GLOBECOM '04, IEEE, Issue Date: Nov. 29-Dec. 3, 2004. Royal Holloway, University of London.
Tulloch, Mitch, "Microsoft Encyclopedia of Security," pp. 218, 300-301, Microsoft Press, 2003, Redmond, Washington.
Gupta et al., "Algorithms for Packet Classification", Computer Systems Laboratory, Stanford University, CA, Mar./Apr. 2001, pp. 1-29.
Heinz Il G., "Priorities in Stream Transmission Control Protocol (SCTP) Multistreaming", Thesis submitted to the Faculty of the University of Delaware, Spring 2003, pp. 1-35.
Internet Protocol,"Darpa Internet Program Protocol Specification", (RFC:791), Information Sciences Institute, University of Southern California, Sep. 1981, pp. 1-49.

Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Modiano E., "Scheduling Algorithms for Message Transmission Over a Satellite Broadcast System," MIT Lincoln Laboratory Advanced Network Group, Nov. 1997, pp. 1-7.

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

Rosen E., et al., "MPLS Label Stack Encoding", (RFC:3032) Network Working Group, Jan. 2001, pp. 1-22, (http://www.ietrorg/rfc/rfc3032.txt).

Wang B., "Priority and Realtime Data Transfer Over the Best-Effort Internet", Dissertation Abstract, Sep. 2005, ScholarWorks©UMASS.

Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

FILE DEDUPLICATION USING STORAGE TIERS

CROSS-REFERENCE TO RELATED APPLICATIONS

This patent application claims priority from U.S. Provisional Patent Application No. 60/987,181 entitled FILE DEDUPLICATION USING STORAGE TIERS filed on Nov. 12, 2007.

This patent application also may be related to one or more of the following patent applications:

U.S. Provisional Patent Application No. 60/923,765 entitled NETWORK FILE MANAGEMENT SYSTEMS, APPARATUS, AND METHODS filed on Apr. 16, 2007.

U.S. Provisional Patent Application No. 60/940,104 entitled REMOTE FILE VIRTUALIZATION filed on May 25, 2007.

U.S. Provisional Patent Application No. 60/987,161 entitled REMOTE FILE VIRTUALIZATION METADATA MIRRORING filed Nov. 12, 2007.

U.S. Provisional Patent Application No. 60/987,165 entitled REMOTE FILE VIRTUALIZATION DATA MIRRORING filed Nov. 12, 2007.

U.S. Provisional Patent Application No. 60/987,170 entitled REMOTE FILE VIRTUALIZATION WITH NO EDGE SERVERS filed Nov. 12, 2007.

U.S. Provisional Patent Application No. 60/987,174 entitled LOAD SHARING CLUSTER FILE SYSTEM filed Nov. 12, 2007.

U.S. Provisional Patent Application No. 60/987,206 entitled NON-DISRUPTIVE FILE MIGRATION filed Nov. 12, 2007.

U.S. Provisional Patent Application No. 60/987,197 entitled HOTSPOT MITIGATION IN LOAD SHARING CLUSTER FILE SYSTEMS filed Nov. 12, 2007.

U.S. Provisional Patent Application No. 60/987,194 entitled ON DEMAND FILE VIRTUALIZATION FOR SERVER CONFIGURATION MANAGEMENT WITH LIMITED INTERRUPTION filed Nov. 12, 2007.

U.S. patent application Ser. No. 12/104,197 entitled FILE AGGREGATION IN A SWITCHED FILE SYSTEM filed Apr. 16, 2008.

U.S. patent application Ser. No. 12/103,989 entitled FILE AGGREGATION IN A SWITCHED FILE SYSTEM filed Apr. 16, 2008.

U.S. patent application Ser. No. 12/126,129 entitled REMOTE FILE VIRTUALIZATION IN A SWITCHED FILE SYSTEM filed May 23, 2008.

All of the above-referenced patent applications are hereby incorporated herein by reference in their entireties.

FIELD OF THE INVENTION

This invention relates generally to storage networks with two or more tiers of storage servers, and more specifically, relates to a more efficient way of storing files that have identical contents in a storage network.

BACKGROUND

In enterprises today, employees tend to keep copies of all of the necessary documents and data that they access often. This is so that they can find the documents and data easily (central locations tend to change at least every so often). Furthermore, employees also tend to forget where certain things were found (in the central location), or never even knew where the document originated (they are sent a copy of the document via email). Finally, multiple employees may each keep a copy of the latest mp3 file, or video file, even if it is against company policy.

This can lead to duplicate copies of the same document or data residing in individually owned locations, so that the individual's themselves can easily find the document. However, this also means a lot of wasted space to store all of these copies of the document or data. And these copies are often stored on more expensive (and higher performance) tiers of storage, since the employees tend not to focus on costs, but rather on performance (they will store data on the location that they can most easily remember that gives them the best performance in retrieving the data).

Deduplication is a technique where files with identical contents are first identified and then only one copy of the identical contents, the single-instance copy, is kept in the physical storage while the storage space for the remaining identical contents is reclaimed and reused. Files whose contents have been deduped because of identical contents are hereafter referred to as deduplicated files. Thus, deduplication achieves what is called "Single-Instance Storage" where only the single-instance copy is stored in the physical storage, resulting in more efficient use of the physical storage space. File deduplication thus creates a domino effect of efficiency, reducing capital, administrative, and facility costs and is considered one of the most important and valuable technologies in storage.

U.S. Pat. Nos. 6,389,433 and 6,477,544 are examples of how a file system provides the single-instance-storage.

While single-instance-storage is conceptually simple, implementing it without sacrificing read/write performance is difficult. Files are deduped without the owners being aware of it. The owners of deduplicated files therefore have the same performance expectation as other files that have no duplicated copies. Since many deduplicated files are sharing one single-instance copy of the contents, it is important to prevent the single-instance copy from being modified. Typically, a file system uses the copy-on-write technique to protect the single-instance copy. When an update is pending on a deduplicated file, the file system creates a partial or full copy of the single-instance copy, and the update is allowed to proceed only after the (partial) copied data has been created and only on the copied data. The delay to wait for the creation of a (partial) copy of the single-instance data before an update can proceed introduces significant performance degradation. In addition, the process to identify and dedupe replicated files also puts a strain on file system resources. Because of the performance degradation, deduplication or single-instance copy is deemed not acceptable for normal use. In reality, deduplication is of no (obvious) benefit to the end-user. Thus, while the feature of deduplication or single-instance storage has been available in a few file systems, it is not commonly used and many file systems do not even offer this feature due to its adverse performance impact.

File system level deduplication offers many advantages for the IT administrators. However, it generally offers no direct benefits to the users of the file system other than performance degradation for those files that have been deduped. Therefore, the success of deduplication in the market place depends on reducing performance degradation to an acceptable level.

Another aspect of the file system level deduplication is that deduplication is usually done on a per file system basis. It is more desirable if deduplication is done together on one or more file systems. For example, the more file systems that are deduped together, the more chances that files with identical contents will be found and more storage space will be reclaimed. For example, if there is only one copy of file A in a file system, file A will not be deduped. On the other hand, if there is a copy of file A in another file system, then together, file A in the two file systems can be deduped. Furthermore, since there is only one single-instance copy for all of the deduplicated files from one or more file systems, the more file systems that are deduped together, the more efficient the deduplication process becomes.

SUMMARY

Thus, it is desirable to achieve deduplication with acceptable performance. It is even more desirable to be able to dedupe across more file systems to achieve more deduplication efficiency.

In accordance with one aspect of the invention there are provided a method and an apparatus for deduplicating files in a file storage system having a primary storage tier and a secondary storage tier. In such embodiments, file deduplication involves identifying a plurality of files stored in the primary storage tier having identical file contents; copying the plurality of files to the secondary storage tier; storing in the primary storage tier a single copy of the file contents; and storing metadata for each of the plurality of files, the metadata associating each of the file copies in the secondary storage tier with the single copy of the file contents stored in the primary storage tier.

In various alternative embodiments, identifying the plurality of files stored in the primary storage tier having identical file contents may involve computing, for each of the plurality of files, a hash value based on the contents of the file; and identifying the files having identical file contents based on the hash values. Storing the single copy of the file contents in the primary storage tier may involve copying the file contents to a designated mirror server; and deleting the remaining file contents from each of the plurality of files in the primary storage tier. Upon a read access to one of the plurality of files, the read access may be directed to the single copy of the file contents maintained in the primary storage tier. Upon a write access to one of the plurality of files, the association between the file copy in the secondary storage tier and the single copy of the file contents stored in the primary storage tier may be broken the file copy stored in the secondary storage tier may be modified. The modified file copy subsequently may be migrated from the secondary storage tier to the primary storage tier based on a migration policy.

In other embodiments, deduplicating a selected file in the primary storage tier may involve determining whether the file contents of the selected file match the file contents of a previously deduplicated file having a single copy of file contents stored in the primary storage tier; when the file contents of the selected file match the file contents of a previously deduplicated file, deduplicating the selected file; otherwise determining whether the file contents of the selected file match the file contents of a non-duplicate file in the first storage tier; and when the file contents of the selected file match the file contents of a non-duplicate file, deduplicating both the selected file and the non-duplicate file. Determining whether the file contents of the selected file match the file contents of a previously deduplicated file may involve comparing a hash value associated with the selected file to a distinct hash value associated with each single copy of file contents stored in the primary storage tier. Deduplicating the selected file may involve copying the selected file to the secondary storage tier; deleting the file contents from the selected file; and storing metadata for the selected file, the metadata associating the file copy in the secondary storage tier with the single copy of the file contents for the previously deduplicated file stored in the primary storage tier. Deduplicating both the selected file and the non-duplicate file may involve copying the selected file and the non-duplicate file to the secondary storage tier; storing in the primary storage tier a single copy of the file contents; and storing metadata for each of the first and second selected files, the metadata associating each of the file copies in the secondary storage tier with the single copy of the file contents stored in the primary storage tier. Storing the single copy of the file contents for deduplicating both the selected file and the non-duplicate file may involve copying the file contents to the designated mirror server; and deleting the remaining file contents from the selected file and the non-duplicate file. Determining whether the file contents of the selected file match the file contents of a non-duplicate file in the primary storage tier may involve maintaining a list of non-duplicate files in the primary storage tier, the list including a distinct hash value for each non-duplicate file; and comparing a hash value associated with the selected file to the hash values associated with the non-duplicate files in the list, and when the file contents of the selected file do not match the file contents of any non-duplicate file, may involve adding the selected file to the list of non-duplicate files (e.g., by storing a pathname and a hash value associated with the selected file). Deduplicating both the selected file and the non-duplicate file may further involve removing the non-duplicate file from the list of non-duplicate files.

Deduplication may be implemented in a file switch or other device that manages file storage.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

This patent application relates generally to a method for performing deduplication on a global namespace using file virtualization when the global namespace is constructed from one or more storage servers, and to enable deduplication as a storage placement policy in a tiered storage environment.

A traditional file system manages the storage space by providing a hierarchical namespace. The hierarchical namespace starts from the root directory, which contains files and subdirectories. Each directory may also contain files and subdirectories identifying other files or subdirectories. Data is stored in files. Every file and directory is identified by a name. The full name of a file or directory is constructed by concatenating the name of the root directory and the names of each subdirectory that finally leads to the subdirectory containing the identified file or directory, together with the name of the file or the directory.

The full name of a file thus carries with it two pieces of information: (1) the identification of the file and (2) the physical storage location where the file is stored. If the physical storage location of a file is changed (for example, moved from one partition mounted on a system to another), the identification of the file changes as well.

For ease of management, as well as for a variety of other reasons, the administrator would like to control the physical storage location of a file. For example, important files might be stored on expensive, high-performance file servers, while less important files could be stored on less expensive and less capable file servers.

Unfortunately, moving files from one server to another usually changes the full name of the files and thus, their identification, as well. This is usually a very disruptive process, since after the move users may not be able to remember the new location of their files. Thus, it is desirable to separate the physical storage location of a file from its identification. With this separation, IT and system administrators will be able to control the physical storage location of a file while preserving what the user perceives as the location of the file (and thus its identity).

Figure 1:
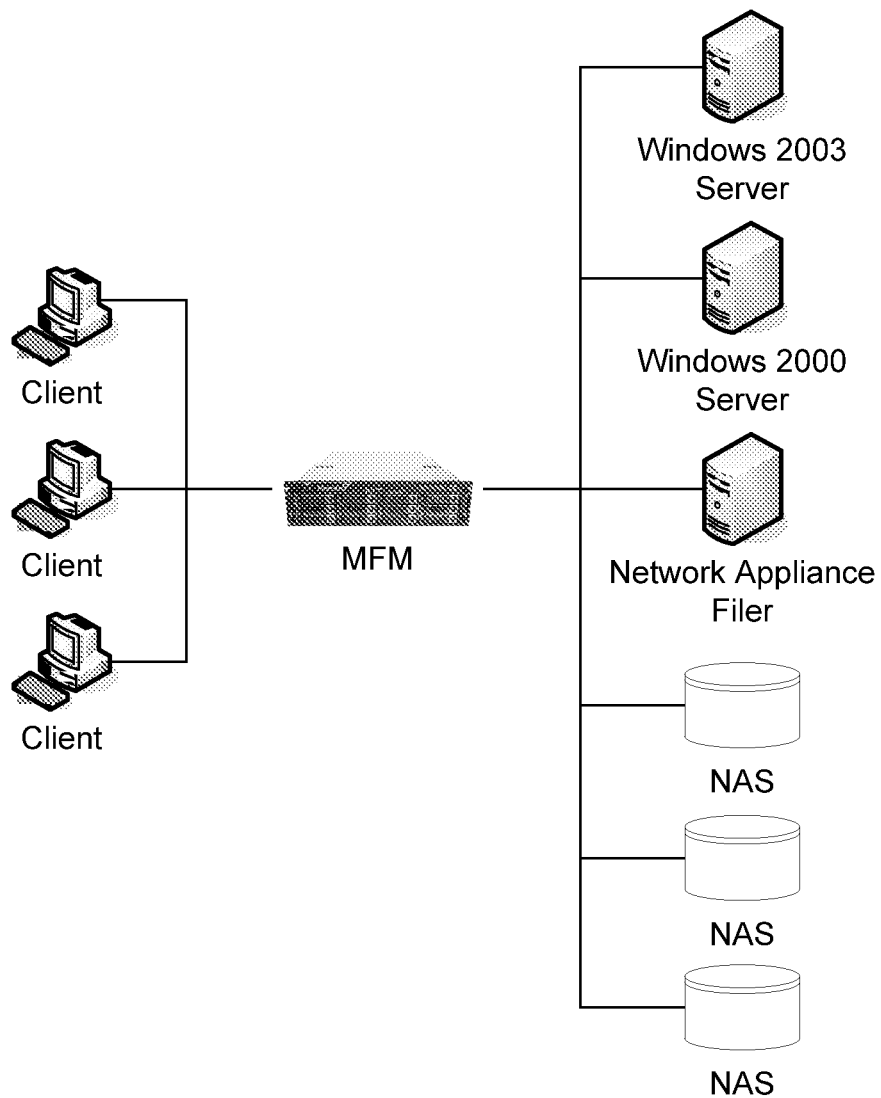
FIG. 1 is a schematic diagram showing an exemplary switched file system including a file switch (MFM) as known in the art.

File virtualization is a technology that separates the full name of a file from its physical storage location. File virtualization is usually implemented as a hardware appliance that is located in the data path between users and the file servers. For users, a file virtualization appliance appears as a file server that exports the namespace of a file system. From the file servers' perspective, the file virtualization appliance appears as just a normal user. Attune System's Maestro File Manager (MFM) is an example of a file virtualization appliance. FIG. 1 is a schematic diagram showing an exemplary switched file system including a file switch (MFM).

As a result of separating the full name of a file from the file's physical storage location, file virtualization provides the following capabilities:

1) Creation of a Synthetic Namespace
   Once a file is virtualized, the full filename does not provide any information about where the file is actually stored. This leads to the creation of synthetic directories where the files in a single synthetic directory may be stored on different file servers. A synthetic namespace can also be created where the directories in the synthetic namespace may contain files or directories from a number of different file servers. Thus, file virtualization allows the creation of a single global namespace from a number of cooperating file servers. The synthetic namespace is not restricted to be from one file server, or one file system.

2) Allows Having Many Full Filenames to Refer to a Single File
   As a consequence of separating a file's name from the file's storage location, file virtualization also allows multiple full filenames to refer to a single file. This is important as it allows existing users to use the old filename while allowing new users to use a new name to access the same file.

3) Allows Having One Full Name to Refer to Many Files
   Another consequence of separating a file's name from the file's storage location is that one filename may refer to many files. Files that are identified by a single filename need not contain identical contents. If the files do contain identical contents, then one file is usually designated as the authoritative copy, while the other copies are called the mirror copies. Mirror copies increase the availability of the authoritative copy, since even if the file server containing the authoritative copy of a file is down, one of the mirror copies may be designated as a new authoritative copy and normal file access can then resumed. On the other hand, the contents of a file identified by a single name may change according to the identity of the user who wants to access the file.

Deduplication is of no obvious benefit to the end users of a file system. Instead of using deduplication as a management policy to reduce storage space and subsequently cause inconvenience to the end users of the deduplicated files, this invention uses deduplication as a storage placement policy to intelligently managed the storage assets of an enterprise, with relatively little inconvenience to the end users.

In embodiments of the present invention, a set of file servers is designated as tier 1 where data stored in these file servers is considered more important to the enterprise. Another (typically non-overlapping) set of file servers is designated as tier 2 storage where data stored in these file servers is considered less important to the business. By using these two storage tiers to identify data important to the business, the system administrators can spend more time and resources to provide faster access and more frequent backup on the data stored on the tier 1 file servers.

Deduplication typically is treated as one of the storage placement policies that decides where data should be stored, e.g., on a tier 1 or tier 2 file server.

In embodiments of the present invention, duplicated data is automatically moved from tier 1 to tier 2. The total storage space used by the deduplicated data on tier 1 and tier 2 remains the same (or perhaps even increases slightly). However, there is more storage space available on tier 1 file servers as a result of deduplication, since all the duplicated data is now stored on tier 2.

There may be performance differences between tier 1 and tier 2 file servers. However, these differences tend to be small since the relatively inexpensive file servers are still very capable. To maintain the same level of performance when accessing the deduplicated files, as each set of duplicated files is moved from the tier 1 file servers, a single instance copy of the file is left behind as a mirror copy. One of the tier 1 file servers is designated as a mirror server where all of the mirror copies are stored. Read access to a deduplicated file is redirected to the deduplicated file's mirror copy. When the first write to a deduplicated file is received, the association from the deduplicated file stored in a tier 2 server to its mirror copy that is stored in a tier 1 server is discarded. Accesses to the "modified" duplicated file will then resume normally from the tier 2 file server. At a certain time, the "modified" deduplicated file is then migrated back to tier 1 storage.

Extending file virtualization to support deduplication is relatively straight forward. First, a set of tier-1 servers is identified as a target for deduplication, and a set of tier 2 servers is identified for receiving deduplicated data. One of the tier 1 file servers is chosen as the mirror server. The mirror server is used to store the mirror copy of each set of deduplicated files with identical contents.

A background deduplication process typically is run periodically within the file virtualization appliance to perform the deduplication. Exemplary embodiments use a sha1 digest computed from the contents of a file to identify files that have identical contents. A sha1 digest value is a 160-bit globally unique value for any given set of data (contents) of a file. Therefore, if two files are identical in contents (but not necessarily name or location), they should always have the same sha1 digest values. And conversely, if two files are different in contents, they should always have different sha1 digest values.

An exemplary deduplication process for the namespace is as follows:

1) Each file stored in the tier 1 file servers that is idle is inspected. If the file has already been deduped, it is skipped.
2) If the file does not have a sha1 digest value, it is computed and saved in the metadata for the file.
3) A check is made if there is a mirror copy stored in the mirror server. If there is, the file is deduped, and this algorithm loops around again with the next file on the tier 1 file servers.
4) The sha1 digest value and the path name of the file are then added to an internal list. If there is no existing entry in the internal list with an identical sha1 digest value, the entry is added and this algorithm loops around again with the next file on the tier 1 file servers.
5) If there is already an entry in the list with the identical sha1 digest value, the current file, as well as the other file with the same sha1 digest value listed in the internal list, will both be individually deduped and the entry in the internal list is removed. This algorithm then loops around with the next file on the tier 1 file servers.
6) The deduplicated process will continue until all the files in the tier 1 storage are processed.

It is possible that the sha1 digest value for a file marked for deduplication may have changed before it is actually deduped. This case should occur relatively infrequently. If it does occur, essentially the worst that can happen is that a file that really has no duplicate files in tier 1 gets deduplicated and migrated to tier 2. However, the deduplicated file eventually should be migrated back to the tier 1 storage tier.

An exemplary process to dedupe a single file (called from the deduplication process for the namespace) is as follows:

1) A check is made to see if there is a mirror copy with an identical sha1 digest.
2) If there is no mirror copy in the mirror server, a new mirror is made with the sha1 digest and the associated file's contents.
3) If there already is a mirror copy, the file is migrated to a tier 2 file server according to the storage placement policy. The migrated file is marked as deduplicated, and a mirror association is created between the migrated file and its mirror copy.

When a non-deduplicated file that has a sha1 digest is opened for update, its sha1 digest is immediately cleared.

When a deduplicated file is opened for update, its sha1 digest is immediately cleared. The mirror association between the deduplicated copy and the mirror copy is immediately broken. The file is no longer a deduplicated file (its deduplicated flag is cleared), and an entry is added to a to-do list to migrate this file back to tier 1 storage in the future.

When a deduplicated file is open for read, a check is made to see if there is a mirror copy stored in the mirror server. If there is, subsequent read requests on the deduplicated file will be switched to the mirror server for processing. Otherwise, the read request is switched to the tier 2 file server containing the actual data of the deduplicated file.

Figure 2:
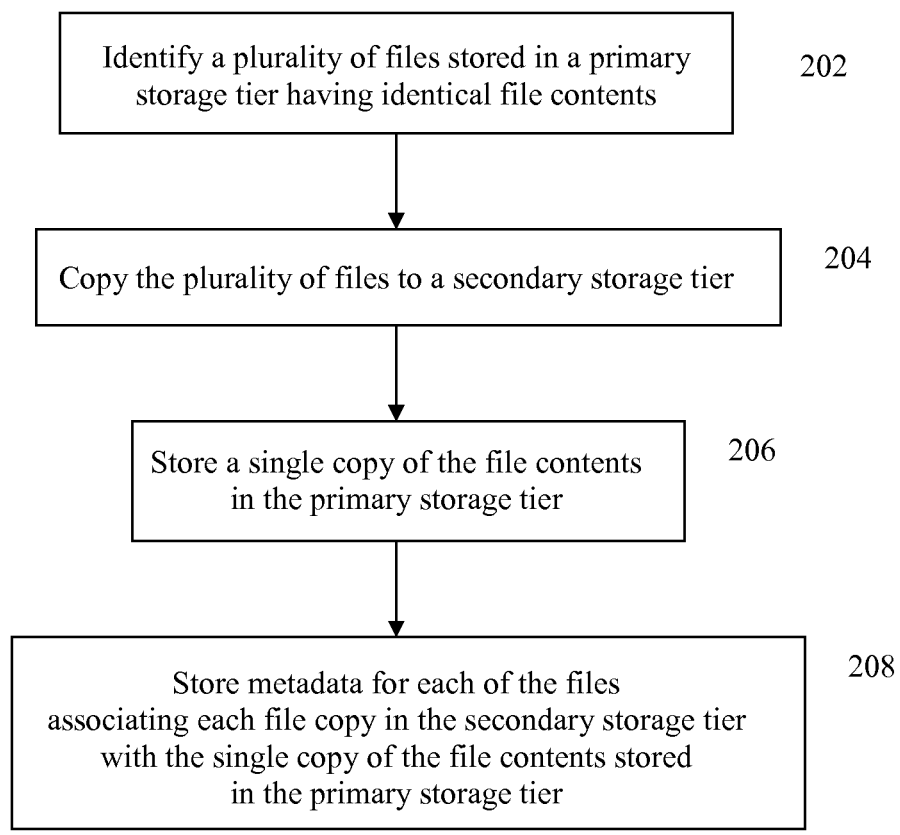
FIG. 2 is a logic flow diagram for file deduplication using storage tiers in accordance with an exemplary embodiment of the present invention.

FIG. 2 is a logic flow diagram for file deduplication using storage tiers in accordance with an exemplary embodiment of the present invention. In block 202, a deduplication device (e.g., a file switch) identifies a plurality of files stored in the primary storage tier having identical file contents. In block 204, the deduplication device copies the plurality of files to the secondary storage tier. In block 206, the deduplication device stores in the primary storage tier a single copy of the file contents. In block 208, the deduplication device stores metadata for each of the plurality of files, the metadata associating each of the file copies in the secondary storage tier with the single copy of the file contents stored in the primary storage tier.

Figure 3:
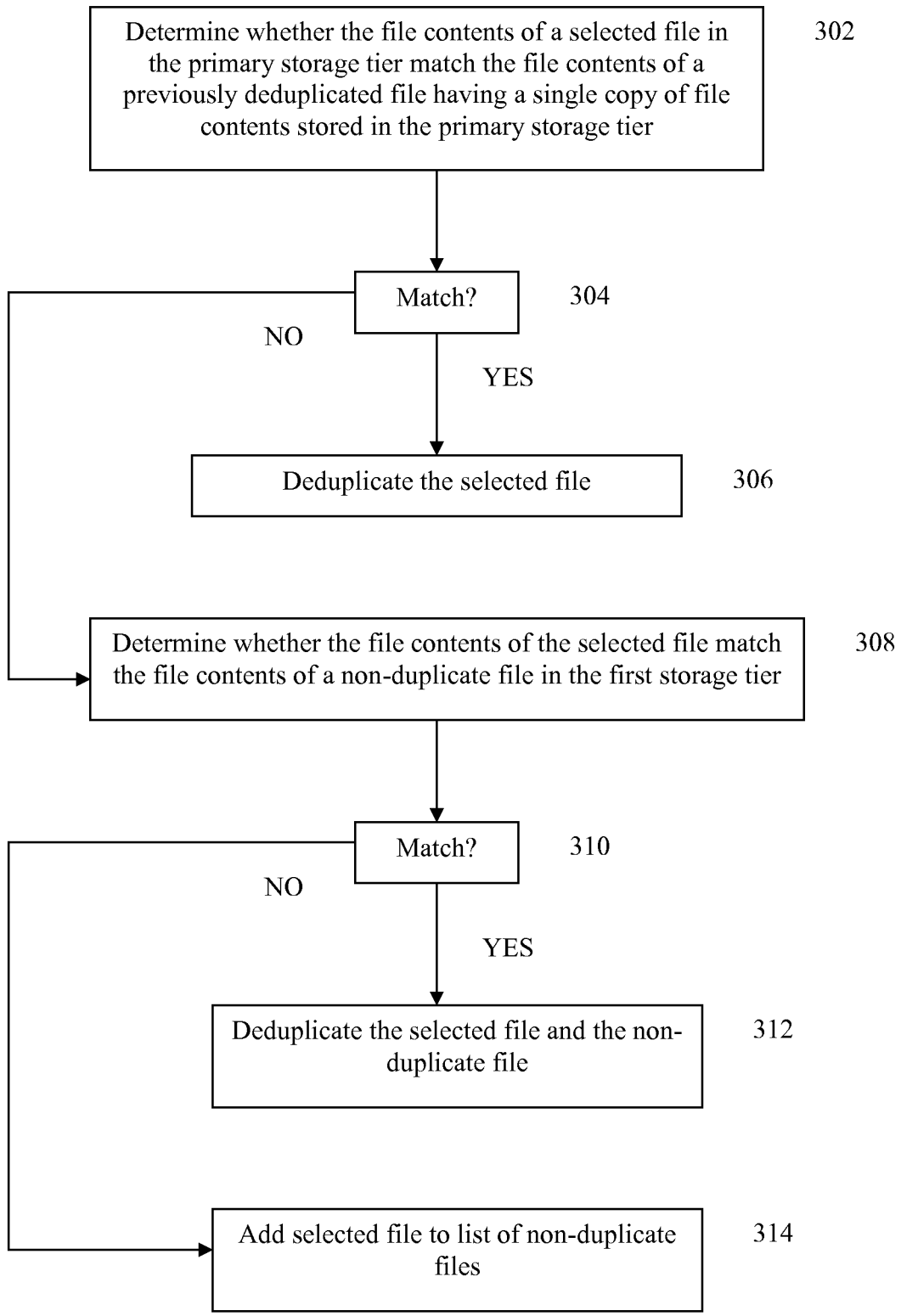
FIG. 3 is a logic flow diagram deduplicating a selected file in accordance with an exemplary embodiment of the present invention.

FIG. 3 is a logic flow diagram deduplicating a selected file in the primary storage tier in accordance with an exemplary embodiment of the present invention. In block 302, the deduplication device, determines whether the file contents of the selected file match the file contents of a previously deduplicated file having a single copy of file contents stored in the primary storage tier. When the file contents of the selected file match the file contents of a previously deduplicated file (YES in block 304), then the deduplication device deduplicates the selected file in block 306, for example, by copying the selected file to the secondary storage tier, deleting the file contents from the selected file, and storing metadata for the selected file associating the file copy in the secondary storage tier with the single copy of the file contents for the previously deduplicated file stored in the primary storage tier. When the file contents of the selected file do not match the file contents of any previously deduplicated file (NO in block 304), then the deduplication device determines whether the file contents of the selected file match the file contents of a non-duplicate file in the first storage tier in block 308. When the file contents of the selected file match the file contents of a non-duplicate file (YES in block 310), then the deduplication device deduplicates both the selected file and the non-duplicate file, for example, by copying the selected file and the non-duplicate file to the secondary storage tier, storing in the primary storage tier a single copy of the file contents, and storing metadata for each of the first and second selected files associating each of the file copies in the secondary storage tier with the single copy of the file contents stored in the primary storage tier. When the file contents of the selected file do not match the file contents of any non-duplicate file (NO in block 310), then the deduplication device may add the selected file a list of non-duplicate files.

It should be noted that file deduplication as discussed herein may be implemented using a file switches of the types described above and in the provisional patent application Ser. No. 60/923,765. It should also be noted that embodiments of the present invention may incorporate, utilize, supplement, or be combined with various features described in one or more of the other referenced patent applications.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of deduplicating files, the method comprising:
   accessing, with a file virtualization device, a virtualized environment including one or more primary storage servers operating as a primary storage tier and storing a first plurality of files and one or more secondary storage servers operating as a secondary storage tier and storing a second plurality of files comprising at least a plurality of files not included in the first plurality of files, wherein a global namespace is associated with the first and second pluralities of files stored in the one or more primary and secondary storage servers;
   identifying, with the file virtualization device, a subset of the first plurality of files that are stored in the primary storage tier and have identical file contents and storing a copy of only the subset of files in the secondary storage tier;
   storing, with the file virtualization device, a single copy of the contents of each of the subset of files in the primary storage tier and deleting all other files having identical file contents from the primary storage tier; and
   storing, with the file virtualization device, metadata associating each of the copies of the subset of files stored in the secondary storage tier with a corresponding one of the single copies stored in the primary storage tier.

2. A method according to claim 1, wherein identifying the subset of files that are stored in the primary storage tier and have identical file contents comprises:
    computing, for each of the plurality of files, a hash value based on contents of the file; and
    identifying files having identical file contents based on a comparison of the hash values.

3. A method according to claim 1, wherein storing the single copy of the contents comprises copying the file contents to a designated mirror server of the primary storage tier.

4. A method according to claim 1, further comprising:
    upon a read access to one of the plurality of files, directing, with the file virtualization device, the read access to the single copy of the contents stored in the primary storage tier.

5. A method according to claim 1, further comprising, upon a write access to one of the plurality of files:
    breaking, with the file virtualization device, the association between the copy in the secondary storage tier and the corresponding single copy of the contents stored in the primary storage tier;
    modifying, with the file virtualization device, the copy stored in the secondary storage tier; and
    migrating, with the file virtualization device, the modified copy from the secondary storage tier to the primary storage tier based on a migration policy.

6. A method according to claim 1, further comprising deduplicating, with the file virtualization device, a selected file in the primary storage tier comprising:
    determining whether contents of the selected file match contents of a previously deduplicated file having a corresponding single copy stored in the primary storage tier;
    when the contents of the selected file match the contents of a previously deduplicated file, deduplicating the selected file;
    otherwise determining whether the contents of the selected file match the contents of a non-duplicate file in the primary storage tier; and
    when the contents of the selected file match the contents of a non-duplicate file, deduplicating both the selected file and the non-duplicate file.

7. A method according to claim 6, wherein determining whether the contents of the selected file match the contents of a non-duplicate file in the primary storage tier comprises:
    maintaining a list of non-duplicate files in the primary storage tier, the list including a distinct hash value for each non-duplicate file;
    comparing a hash value associated with the selected file to the hash values associated with the non-duplicate files in the list; and
    when the contents of the selected file do not match the contents of any non-duplicate file, adding the selected file to the list of non-duplicate files.

8. A virtualization apparatus for deduplicating files, the apparatus comprising:
    at least one communication interface for communicating with one or more primary and secondary storage servers; and
    at least one of configurable hardware logic configured to be capable of implementing or a processor configured to execute program instructions stored in a memory comprising:
        accessing a virtualized environment including the one or more primary storage servers operating as a primary storage tier and storing a first plurality of files and the one or more secondary storage servers operating as a secondary storage tier and storing a second plurality of files comprising at least a plurality of files not included in the first plurality of files, wherein a global namespace is associated with the first and second pluralities of files stored in the one or more primary and secondary storage servers;
        identifying a subset of the accessed files that are stored in the primary storage tier and have identical file contents and storing a copy of only the subset of files in the secondary storage tier;
        storing a single copy of the contents of each of the subset of files in the primary storage tier and deleting all other files having identical file contents from the primary storage tier; and
        storing metadata associating each of the copies of the subset of files stored in the secondary storage tier with a corresponding one of the single copies stored in the primary storage tier.

9. An apparatus according to claim 8, wherein identifying the subset of files that are stored in the primary storage tier and have identical file contents further comprises:
    computing, for each of the plurality of files, a hash value based on contents of the file; and
    identifying files having identical contents based on a comparison of the hash values.

10. Apparatus according to claim 8, wherein storing the single copy of the contents further comprises copying the file contents to a designated mirror server of the primary storage tier.

11. An apparatus according to claim 8, wherein at least one of configurable hardware logic further configured to be capable of implementing or the processor is further configured to execute program instructions stored in a memory further comprising upon a read access to one of the plurality of files, directing the read access to the single copy of the contents stored in the primary storage tier.

12. An apparatus according to claim 8, wherein at least one of configurable hardware logic further configured to be capable of implementing or the processor is further configured to execute program instructions stored in a memory further comprising upon a write access to one of the plurality of files:
    breaking the association between the copy in the secondary storage tier and the corresponding single copy of the contents stored in the primary storage tier;
    modifying the copy stored in the secondary storage tier; and
    migrating the modified copy from the secondary storage tier to the primary storage tier based on a migration policy.

13. An apparatus according to claim 8, wherein at least one of configurable hardware logic further configured to be capable of implementing or the processor is further configured to execute program instructions stored in a memory further comprising deduplicating a selected file in the primary storage tier comprising:
    determining whether contents of the selected file match contents of a previously deduplicated file having a corresponding single copy stored in the primary storage tier;
    when the contents of the selected file match the contents of a previously deduplicated file, deduplicating the selected file;
    otherwise determining whether the contents of the selected file match the contents of a non-duplicate file in the primary storage tier; and when the contents of the selected file match the contents of a non-duplicate file, deduplicating both the selected file and the non-duplicate file.

14. An apparatus according to claim 13, wherein determining whether the contents of the accessed file match the contents of a non-duplicate file in the primary storage tier further comprises:
    maintaining a list of non-duplicate files in the primary storage tier, the list including a distinct hash value for each non-duplicate file;
    comparing a hash value associated with the selected file to the hash values associated with the non-duplicate files in the list; and
    when the contents of the selected file do not match the contents of any non-duplicate file, adding the selected file to the list of non-duplicate files.

15. A system that deduplicates files, the system comprising:
    one or more primary storage servers operating as a primary storage tier and storing a first plurality of files and one or more secondary storage servers operating as a primary storage tier and storing a second plurality of files comprising at least a plurality of files not included in the first plurality of files, the storage servers storing the first and second pluralities of files in a virtualized environment, wherein a global namespace is associated with the first and second pluralities of files stored in the one or more primary and secondary storage servers;
    a file virtualization device including at least one of configurable hardware logic configured to be capable of implementing or a processor configured to execute program instructions stored in a memory comprising:
        identifying a subset of the plurality of files that are stored in the primary storage tier and have identical file contents and storing a copy of only the subset of files in the secondary storage tier;
        storing a single copy of the contents of each of the subset of files in the primary storage tier and deleting all other files having identical file contents from the primary storage tier; and
        storing metadata associating each of the copies of the subset of files stored in the secondary storage tier with a corresponding one of the single copies stored in the primary storage tier.

16. A system according to claim 15, wherein identifying the subset of files that are stored in the primary storage tier and have identical file contents further comprises:
    computing, for each of the plurality of files, a hash value based on contents of the file; and
    identifying files having identical contents based on a comparison of the hash values.

17. A system according to claim 15, wherein storing the single copy of the contents further comprises copying the file contents to a designated mirror server of the primary storage tier.

18. A system according to claim 15, wherein at least one of configurable hardware logic further configured to be capable of implementing or the processor is further configured to execute program instructions stored in a memory further comprising upon a read access to one of the plurality of files, directing the read access to the single copy of the contents stored in the primary storage tier.

19. A system according to claim 15, wherein at least one of configurable hardware logic further configured to be capable of implementing or the processor is further configured to execute program instructions stored in a memory further comprising upon a write access to one of the plurality of files:
    breaking the association between the copy in the secondary storage tier and the corresponding single copy of the contents stored in the primary storage tier;
    modifying the copy stored in the secondary storage tier; and
    migrating the modified copy from the secondary storage tier to the primary storage tier based on a migration policy.

20. A system according to claim 15, wherein at least one of configurable hardware logic further configured to be capable of implementing or the processor is further configured to execute program instructions stored in a memory further comprising deduplicating a selected file in the primary storage tier comprising:
    determining whether contents of the selected file match contents of a previously deduplicated file having a corresponding single copy stored in the primary storage tier;
    when the contents of the selected file match the contents of a previously deduplicated file, deduplicating the selected file;
    otherwise determining whether the contents of the selected file match the contents of a non-duplicate file in the primary storage tier; and
    when the contents of the selected file match the contents of a non-duplicate file, deduplicating both the selected file and the non-duplicate file.

21. A system according to claim 20, wherein determining whether the contents of the accessed file match the contents of a non-duplicate file in the primary storage tier further comprises:
    maintaining a list of non-duplicate files in the primary storage tier, the list including a distinct hash value for each non-duplicate file;
    comparing a hash value associated with the selected file to the hash values associated with the non-duplicate files in the list; and
    when the contents of the selected file do not match the contents of any non-duplicate file, adding the selected file to the list of non-duplicate files.

22. A non-transitory computer readable medium having stored thereon instructions for deduplicating files comprising machine executable code which when executed by at least one processor, causes the processor to perform steps comprising:
    accessing a plurality of files stored in a virtualized environment including one or more primary storage servers operating as a primary storage tier and storing a first plurality of files and one or more secondary storage servers operating as a secondary storage tier and storing a second plurality of files comprising at least a plurality of files not included in the first plurality of files, wherein a global namespace is associated with the first and second pluralities of files stored in the one or more primary and secondary storage servers;
    identifying a subset of the accessed files that are stored in the primary storage tier and have identical file contents and storing a copy of only the subset of files in the secondary storage tier;
    storing a single copy of the contents of each of the subset of files in the primary storage tier and deleting all other files having identical file contents from the primary storage tier; and
    storing metadata associating each of the copies of the subset of files stored in the secondary storage tier with a corresponding one of the single copies stored in the primary storage tier.

23. A non-transitory computer readable medium according to claim 22, wherein identifying the subset of files that are stored in the primary storage tier and have identical file contents further comprises:
  computing, for each of the plurality of files, a hash value based on contents of the file; and
  identifying files having identical contents based on a comparison of the hash values.

24. A non-transitory computer readable medium according to claim 22, wherein storing the single copy of the contents further comprises copying the file contents to a designated mirror server of the primary storage tier.

25. A non-transitory computer readable medium according to claim 22, further having stored thereon instructions that when executed by the at least one processor cause the processor to perform steps further comprising upon a read access to one of the plurality of files, directing the read access to the single copy of the contents stored in the primary storage tier.

26. A non-transitory computer readable medium according to claim 22, further having stored thereon instructions that when executed by the at least one processor cause the processor to perform steps further comprising:
  breaking the association between the copy in the secondary storage tier and the corresponding single copy of the contents stored in the primary storage tier;
  modifying the copy stored in the secondary storage tier; and
  migrating the modified copy from the secondary storage tier to the primary storage tier based on a migration policy.

27. A non-transitory computer readable medium according to claim 22, further having stored thereon instructions that when executed by the at least one processor cause the processor to perform steps further comprising deduplicating a selected file in the primary storage tier comprising:
  determining whether contents of the selected file match contents of a previously deduplicated file having a corresponding single copy stored in the primary storage tier;
  when the contents of the selected file match the contents of a previously deduplicated file, deduplicating the selected file;
  otherwise determining whether the contents of the selected file match the contents of a non-duplicate file in the primary storage tier; and
  when the contents of the selected file match the contents of a non-duplicate file, deduplicating both the selected file and the non-duplicate file.

28. A non-transitory computer readable medium according to claim 27, wherein determining whether the contents of the accessed file match the contents of a non-duplicate file in the primary storage tier further comprises:
  maintaining a list of non-duplicate files in the primary storage tier, the list including a distinct hash value for each non-duplicate file;
  comparing a hash value associated with the selected file to the hash values associated with the non-duplicate files in the list; and
  when the contents of the selected file do not match the contents of any non-duplicate file, adding the selected file to the list of non-duplicate files.

* * * * *